US006675370B1

(12) United States Patent
Sundaresan

(10) Patent No.: US 6,675,370 B1
(45) Date of Patent: *Jan. 6, 2004

(54) SYSTEM AND METHOD FOR IMBEDDING HYPERLINKED LANGUAGE GRAMMAR NOTATION IN A "LITERATE" PROGRAMMING ENVIRONMENT

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,867

(22) Filed: Feb. 2, 2000

(51) Int. Cl.⁷ .................................................. G06F 9/44
(52) U.S. Cl. ........................ 717/106; 717/100; 717/114; 717/116; 717/142; 717/143; 715/512; 715/513; 715/514
(58) Field of Search ................................. 717/114, 116, 717/148, 106, 100, 101, 112, 118, 107, 143, 142; 704/277, 218; 715/513, 514, 512

(56) References Cited

U.S. PATENT DOCUMENTS

| | | | | |
|---|---|---|---|---|
| 5,333,317 A | * | 7/1994 | Dann | 707/5 |
| 5,526,522 A | * | 6/1996 | Takeuchi | 717/107 |
| 5,530,852 A | * | 6/1996 | Meske et al. | 709/206 |
| 5,678,052 A | * | 10/1997 | Brisson | 704/4 |
| 5,768,564 A | | 6/1998 | Andrews et al. | 395/500 |
| 5,905,894 A | | 5/1999 | De Bonet | 395/705 |
| 6,073,143 A | * | 6/2000 | Nishikawa et al. | 715/513 |
| 6,083,276 A | * | 7/2000 | Davidson et al. | 717/107 |
| 6,272,673 B1 | * | 8/2001 | Dale et al. | 717/100 |
| 6,275,862 B1 | * | 8/2001 | Sharma et al. | 709/245 |
| 6,336,211 B1 | * | 1/2002 | Soe | 717/108 |
| 6,336,214 B1 | * | 1/2002 | Sundaresan | 717/143 |
| 6,405,365 B1 | * | 6/2002 | Lee | 717/106 |
| 6,480,865 B1 | * | 11/2002 | Lee et al. | 715/523 |
| 6,487,566 B1 | * | 11/2002 | Sundaresan | 715/513 |
| 6,516,322 B1 | * | 2/2003 | Meredith | 707/102 |
| 6,594,823 B1 | * | 7/2003 | Corbin et al. | 717/143 |
| 6,596,031 B1 | * | 7/2003 | Parks | 715/513 |

OTHER PUBLICATIONS

Title: Implementing Catalog clearinghouses with XML and XSL, author: Royappa, ACM, 1998.*
Title: Analysis and Conversion of Documents, author: Tay-en–Bey, IEEE, 1998.*
Title: Declarative specification of data–intensive Web sites, author: Fernández, ACM, 1999.*
Title: Enabling hypermedia messaging: BPRM—a body part relationship module, author: K. Lenssen, ACM, 1994.*
"Nuweb Version 0.87b a Simple Literate Programming Tool" http://www.tu–chemnitz.de/~ukn/UNIX/nuwebdoc/nuwebdoc.html.
"FunnelWeb" http://www.ross.net/funnelweb/.
"Javadoc 1.2" http://java.sun.com/products/jdk/1.2/docs/tooldocs/javadoc/index.html.
"IBM, Oracle, Unisys Back XMI Standard" http://www.computerworld.com/home/news.nsf/aa/9811124xmi2.

* cited by examiner

Primary Examiner—Chameli C. Das
(74) Attorney, Agent, or Firm—Lacasse & Associates, LLC; Randy W. Lacasse; Mark M. MacCabe, Esq.

(57) ABSTRACT

Documentation of a software application is automatically generated for the classes, written in an object oriented-language, which comprise the application. The classes within the application are typically arranged in a hierarchy and contain productions of a specification grammar in Extended Backus Naur form. The automatically generated documentation corresponding to these productions are closely wired to the underlying class hierarchy by creating hypertext links between the productions in different classes. Thus, these generated hyperlinks allow browsing of the automatically generated documentation according to the hierarchical structure of the classes in the object-oriented class hierarchy being documented.

30 Claims, 3 Drawing Sheets

300

302 - @production <production lhs-nt="Property"><rhs-nt name="value">| <rhs-nt name="obj" class="com.ibm.rdf.RDFObj">* FOOBAR
The above production stands for the EBNF production

304 - Property => value | obj* FOOBAR

Where the production for value is in the same Java file while the one for obj is in a different one called "com.ibm.rdf.RDFObj".

Generated HTML
```
<table>
  <tr><td><a name="Property">Property</a></td>
      <td>=></td>
      <td><a href="#value">value</a> | <a href="com.ibm.rdf.RDFObj.html#obj">obj</a>* FOOBAR</td>
  </tr>
</table>
```

Figure 3b

SYSTEM AND METHOD FOR IMBEDDING HYPERLINKED LANGUAGE GRAMMAR NOTATION IN A "LITERATE" PROGRAMMING ENVIRONMENT

BACKGROUND OF THE INVENTION

1. Field of Invention

The present invention generally relates to Literate Programming. The method and apparatus of the present invention have particular application to automatic generation of software documentation.

2. Discussion of Prior Art

The support and maintenance of large, complex software applications are made much simpler by embedding documentation and explanatory comments in the application's source code. The concept of "Literate Programming" is a big effort in this area. Its proponents advocate a system where a program's source code and comments read almost like a technical journal article.

In Literate Programming, software tools are used to automatically generate documentation from a program's source code file, a process known as weaving. With the recent pervasiveness of the Internet, much effort has been applied to create methods to automatically generate browsable documentation which takes advantage of hyperlinking and other HTML properties.

The prior art, discussed below, describes different methods of parsing source code to generate documentation or additional code automatically.

The patent to Brisson (U.S. Pat. No. 5,678,052) provides an automated translation method between high level programming languages. This reference focuses on maintaining valid pre-processor constructs between the different translations.

The patent to De Bonet (U.S. Pat. No. 5,905,894) teaches extending programming language precompiler directive functionality to support the passing of code segments as arguments to other functions at compile time. The goal is to improve run-time performance and does not involve documentation generation.

The patent to Takeuchi (U.S. Pat. No. 5,526,522) teaches automatic programming generation which converts a specification document into a syntactic tree and then recursively creates source code.

The patent to Andres et al. (U.S. Pat. No. 5,768,564) provides for a grammar converter which parses a text-based BNF grammar and produces a compressed "rail-road" diagram.

Two Literate Programming tools presently available are NuWeb(TM) and FunnelWeb(TM). They are language independent pre-processors and can produce documentation in HTML according to macro definitions in user programs.

Javadoc is a standard tool of a Java compiler that parses the declarations and comments in a set of Java source files and produces a set of HTML pages describing the files' classes, interfaces, methods and fields. Typically, for each class, a single HTML document is generated.

Whatever the precise merits and features of the prior art in this field, the earlier art does not achieve or fulfill the purposes of the present invention. The prior art does not provide for automatically generating documentation for an object-oriented application which enables cross-linking between the different classes.

SUMMARY OF THE INVENTION

In the present invention, documentation of a software application is automatically generated for the classes, written in an object oriented-language, which comprise the application. The classes within the application are typically arranged in a hierarchy and contain productions of a specification grammar in Extended Backus Naur form. The automatically generated documentation corresponding to these productions is closely wired to the underlying class hierarchy by creating hypertext links between the productions in different classes. Thus, these generated hyperlinks allow browsing of the automatically generated documentation according to the hierarchical structure of the classes in the object-oriented class hierarchy being documented.

BRIEF DESCRIPTION OF THE DRAWINGS

FIGS. 3a and 3b illustrate an example of EBNF production and corresponding HTML code generated according to the present invention.

DESCRIPTION OF THE PREFERRED EMBODIMENTS

Figure 1:
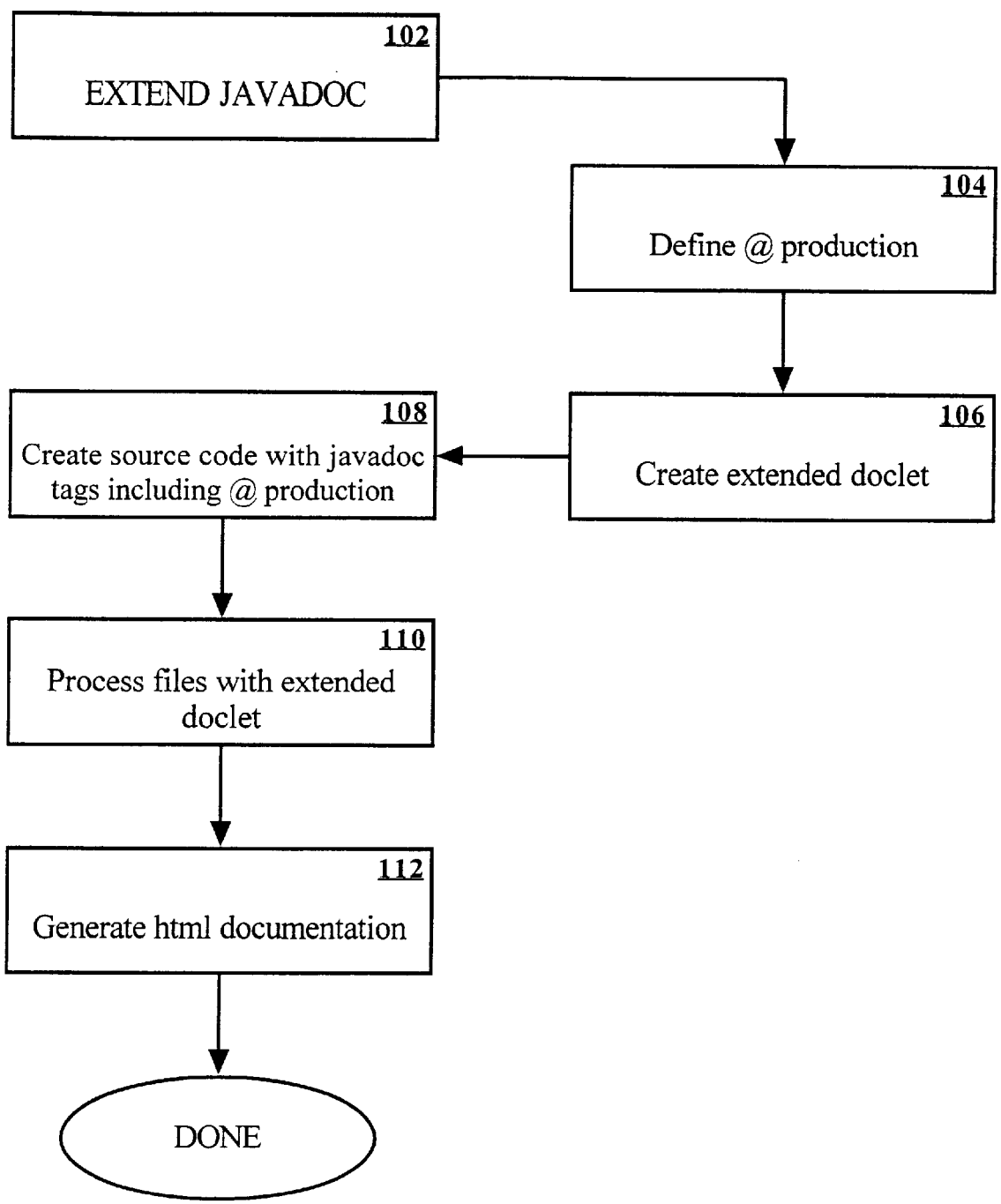
FIG. 1 illustrates a flowchart which describes the method of the present invention to generate HTML documentation.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

Unlike earlier languages which Literate Programming principles were applied to, object-oriented (OO) languages typically produce a hierarchical structured program. The present invention is directed towards providing automatically generated, browsable documentation which follows, or is closely wired to, the hierarchical structure of the classes being documented.

In OO programming languages, programs are typically developed through an OO analysis and design process. This means that the class hierarchy in the code is expressible in some type of specification language that expresses the relationship between classes. Documentation for these classes should also be wired-up according to this class hierarchy. Doing so improves the usability and applicability of the documentation.

The documentation of particular interest to the present invention is the EBNF (Extended Backus Naur forms) productions within a class description. These productions define and document a class and sometimes must refer to another class outside of the class in which they reside. The automatically generated, browsable representation of these productions, according to the present invention, reflect the class hierarchy of the classes being documented and allow a user to browse this closely wired documentation.

The present invention is applicable to all OO programming languages, examples of which include: C++, Java, Ada 95, Smalltalk, and Eiffel. However, a preferred embodiment will be presented in relation to Java and XML (extended markup language).

Java has a method of attaching documentation to code known as Javadoc. Javadoc is a simple tag language for providing documentation within a source program from which HTML is automatically generated. The current capability of Javadoc allows methods, variables and constructors to be wired-up within Java classes. The present invention provides the additional capability to automatically generate browsable documentation with hyperlinks between the classes (or within the same class) through EBNF productions in a class specification.

The Javadoc language is extensible and allows a user to define and specify their own tags to be processed by the Javadoc processor. This extensibility is utilized by the present invention to define additional Javadoc tags to wire up any EBNF productions in a class.

Javadoc doclets are programs written in the Java language to specify the content and format of the Javadoc tool. The Javadoc tool comes with a standard doclet, but writing custom doclets is within the scope of one skilled in the art of Java programming. To extend the capability of Javadoc to allow for the present invention, an extended doclet is written to handle a custom Javadoc tag. This custom Javadoc tag defines EBNF productions located in the class being documented by the Javadoc processor. The extended doclet processes all other Javadoc tags in the standard way using the standard doclet but recognizes the custom Javadoc tag, extracts the tag's value and generates appropriate HTML output.

Typical tag languages, such as Javadoc, are flat in nature. That is, a tag occurrence in a program is a (tag name, tag value) pair. For instance, @see com.ibm.rdf in Java defines the occurrence of the "see" tag with the value "com.ibm.rdf". To define EBNF productions, however, a hierarchy of tags (i.e. tags within tags) is needed.

The present invention introduces a custom Javadoc tag, @production, to represent each of the productions in a class. The value associated with this tag is an XML structure representing that production. An XML structure is used because it has the capability to define the necessary hierarchical tag structure. Other extensible tag languages also have this characteristics and are considered within the scope of the present invention.

The following XML document type declaration (DTD) defines one way of validly forming a production tag according to the present invention; other functionally equivalent definitions are also contemplated:

```
<!ELEMENT   production (rhs)*>
<!ATTLIST   production
            lhs-nt NMTOKEN #required>
<!ELEMENT   rhs (rhs-nt|PCDATA)*>
<!ELEMENT   rhs-nt EMPTY>
<!ATTLIST   rhs-nt
            name NMTOKEN #required
            classname NMTOKEN #IMPLIED>
```

The XML structure defined by this DTD has the following information: a left-hand-side non-terminal and a list of right-hand-side elements. The right-hand-side references are either non-terminal (i.e. rhs-nt) or quoted strings (for terminals). References to non-terminals on the right-hand-side are non-terminals occurring on the left-hand-side of a production either within the same class or a different one. In the latter case, an optional "classname" attribute is provided to identify the different class.

FIG. 1 illustrates an overview of the present invention. In step 102, the standard Javadoc doclet is extended by defining 104 a custom tag, @production, and creating 106 an extended doclet to process this tag.

In step 108, source programs are created which include the @production tags to represent EBNF productions in class specification grammars. A user creating these tags must take notice of which productions occur within each class and form the @production tags appropriately.

The source code is then processed, in step 110, by the Javadoc processor using the extended doclet. Finally, in step 112, the automatically generated HTML documentation for each class is generated.

Figure 2:
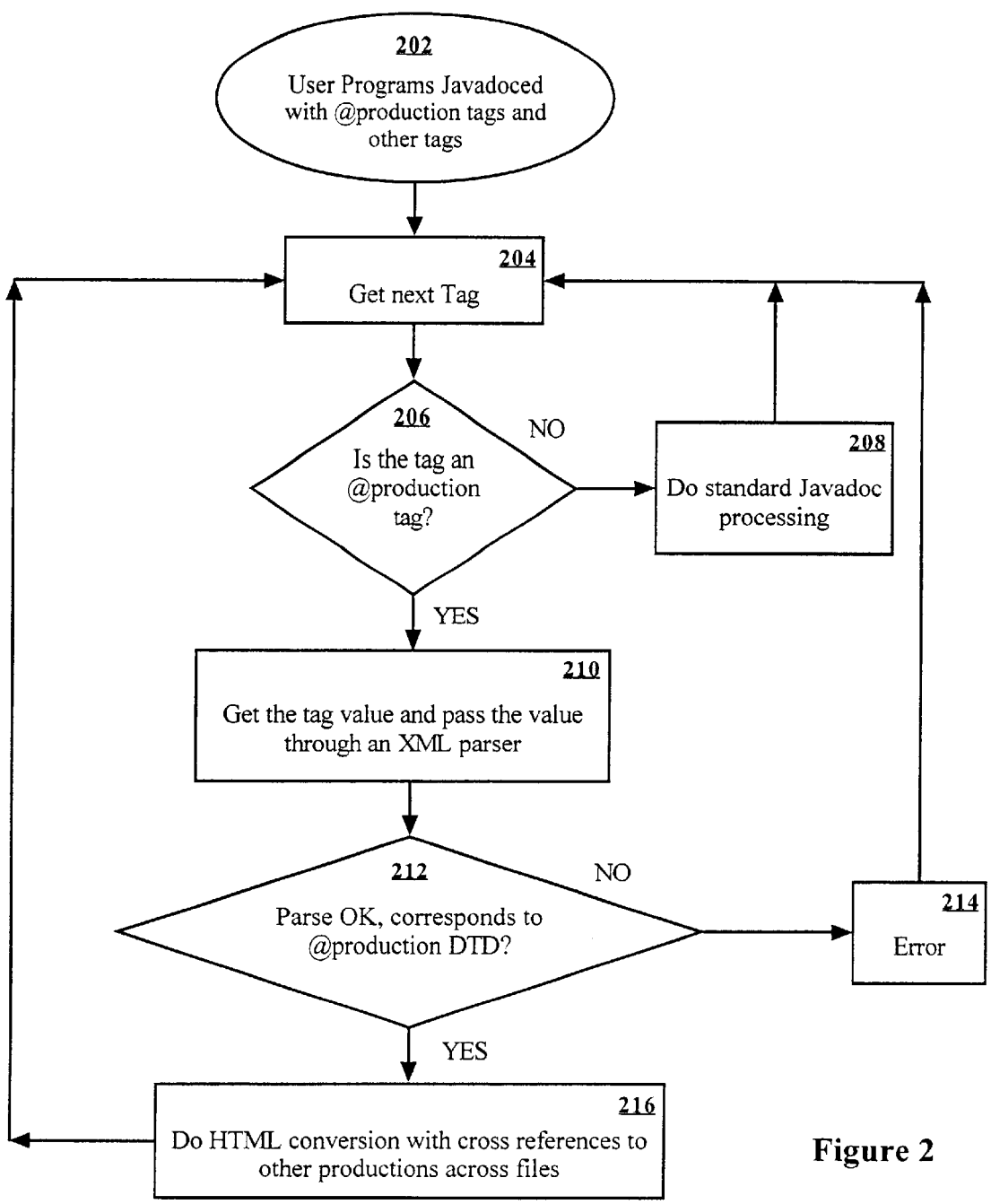
FIG. 2 illustrates a flowchart depicting the steps of a tag processor which translates representations of productions into HTML.

The extended Javadoc doclet processes 110 (FIG. 1) source code according to the flowchart depicted in FIG. 2.

In step 202, source code files are introduced into the processor and a next tag is located by step 204. If there is no next tag, then the processing is finished.

If a next tag was located, then step 206 determines if it is an @production tag. If not, then step 208 is performed and the standard Javadoc processing of that tag is accomplished. Flow then returns to step 204 to extract a next tag.

If the next tag is an @production tag, then step 210 extracts and parses the tag value from the tag. This parsed tag value is a string holding an XML structure which represents an EBNF production. The parsing of the tag value is tested 212 according to a DTD which defines a validly formed XML production. If the value is not valid, then an error is noted in step 214 and processing continues with the next tag in step 204. However, if the tag value is valid, then step 216 creates the HTML documentation corresponding to the production, including any necessary cross-references to productions in other classes.

The following example illustrated in FIG. 3, details a preferred method of generating HTML corresponding to a production. For this example 300, a class contains a production (in EBNF notation) 304:

Property→value|obj*FOOBAR where the production for "value" is in the same class. The production for "obj", however, is in a different class called "com.ibm.rdf.RDFObj".

| | |
|---|---|
| @production | <production lhs-nt="Property"> |
| |   <rhs-nt name="value">   | |
| |   <rhs-nt name="obj" class="com.ibm.rdf.RDFObj">*FOOBAR |

When run through the extended processor, the @production tag 302 is recognized along with the valid form of the corresponding XML structure and produces the following HTML 350:

```
<table>
<tr>
<td><a name="Property">Property</a></td>
<td>=></td>
<td><a href="#value">value</a> |
    <a href="com.ibm.rdf.RDFObj.html#obj">obj</a>*FOOBAR </td>
</tr>
</table>
```

The extended doclet, which automatically generates the documentation, creates the HTML tags to define a table and then creates the anchor tag 352 named "Property". This anchor tag is capable of being referenced by HTML documentation of other productions' right-hand-sides within this class or even by the HTML documentation of productions in different classes. Next the production symbol "→" is written; this symbol separates the left-hand-side and right-hand-side of an EBNF. In the example, the greater than sign of "→" is escaped and written as "=>".

The first reference to another production is "value" and a hypertext link 354 to its anchor point within the present document is generated. The second reference to another production is "obj" and this needs to link outside the present class; so, its anchor point 356 is made in reference to the HTML document (com.ibm.rdf.RDFObj.html) documenting its class (com.ibm.rdf.RDFObj).

The above HTML 350 is an example of a preferred embodiment which displays the productions in an HTML format closely resembling the EBNF notation. Other functionally equivalent output formats, which include cross-linking between classes, are also contemplated within the scope of the present invention. For example, in addition to a single HTML HREF crosslink, the present invention also contemplates within its scope extended or multiway links as in the Xlink specification of XML or the Hytime specification of SGML.

As indicated, the preferred embodiment was presented in terms of Java and XML. However, the use of other OO programming languages are also contemplated. For some of these languages which do not have existing documentation facilities (e.g. C++), a pre-processor is easily introduced which processes the files to produce browsable documentation. Furthermore, the use of extensible tag languages other than XML to encode the wiring expressed by the EBNF syntax is also contemplated. In addition, language independent pre-processors like FunnelWeb (TM) and NuWeb (TM) as well as languages able to describe context free grammars are functionally equivalent means to implement the present invention.

CONCLUSION

A system and method have been shown in the above embodiment for the effective implementation of the automatic generation of program documentation for a multi-class, object oriented application in which the documentation of productions within separate classes is browsable and implements hypertext links cross-linking the classes' documentation. While various embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, computer hardware platform, specific object-oriented programming language, specific extensible tag documentation language, specific specification grammar or specific browsable output language. In addition, the present invention can be implemented locally on a single PC, connected workstations (i.e. networked-LAN), across extended networks such as the Internet or using portable equipment such as laptop computers or wireless equipment (RF, microwaves, infrared, photonics, etc.).

What is claimed is:

1. A computer-based system for generating software documentation, said system including an extended documentation tag language representing an EBNF (Extended Backus Naur forms) production introduced in a first class and comprising:
    a parser which identifies a set of extended tags, said extended tags comprising:
        an identification tag and corresponding value for a left-hand-side of said EBNF production;
        an identification tag and corresponding value for each of a set of right-hand-side elements of said EBNF production;
        a class tag and corresponding value for each of said set of right-hand-side elements of said EBNF production;
        said class tag and corresponding value implied for any right-hand-side element also introduced in said first class and said class tag and corresponding value explicit for any right-hand-side element introduced in a class other than said first class; and
    a documentation generator which uses said corresponding value to produce documentation for each element within said set of extended tags.

2. A computer-based system for generating software documentation, said system including an extended documentation tag language representing an EBNF production defined in a first class, as per claim 1, wherein said corresponding value implied for any right-hand-side element introduced in said first class is equal to a name of said first class.

3. A computer-based system for generating software documentation, said system including an extended documentation tag language representing an EBNF production defined in a first class, as per claim 1, wherein said explicit corresponding value for any right-hand-side element introduced in a class other than said first class is equal to a name of a class where said any right-hand-side element was introduced.

4. A computer-based system for generating software documentation, said system including an extended documentation tag language representing an EBNF production defined in a first class, as per claim 1, wherein said tag language is implemented in an extensible tag language.

5. A computer-based system for generating software documentation, said system including an extended documentation tag language representing an EBNF production defined in a first class, as per claim 4, wherein said extensible tag language is XML.

6. A computer-based system for generating software documentation, said system including an extended documentation tag language representing an EBNF production defined in a first class, as per claim 1, wherein said tag language is implemented in a language which describes context-free grammars.

7. A computer-based system for generating software documentation, said system including an extended documentation tag language representing an EBNF production defined in a first class, as per claim 1, wherein said tag language defines a java-based tag.

8. A computer-based system for generating software documentation, said system including an extended documentation tag language representing an EBNF production defined in a first class, as per claim 7, wherein said java-based tag is an @production tag.

9. A documentation processor that generates browsable documentation cross-linking a set of EBNF productions in at least one class comprising:

an extended tag used to represent an EBNF production;

an extractor which extracts a set of documentation tags from at least one file;

a parser which identifies a set of extended tags, if present, within said set of documentation tags;

a resolver which determines, for each element of said set of extended tags, a corresponding reference to at least one other element within said set of extended tags;

a documentation generator which uses said corresponding reference to produce documentation for each element within said set of extended tags.

10. A documentation processor that generates browsable documentation cross-linking a set of EBNF productions in at least one class, as per claim 9, wherein said documentation is a part of a first hypertext file.

11. A documentation processor that generates browsable documentation cross-linking a set of EBNF productions in at least one class, as per claim 10, wherein said first hypertext file is an HTML file.

12. A documentation processor that generates browsable documentation cross-linking EBNF productions in at least one class, as per claim 10, wherein said documentation further comprises a first hypertext anchor in said first hypertext file.

13. A documentation processor that generates browsable documentation cross-linking EBNF productions in at least one class, as per claim 12, wherein said documentation further comprises a hypertext link to a second anchor in said first hypertext file.

14. A documentation processor that generates browsable documentation cross-linking EBNF productions in at least one class, as per claim 10, wherein said documentation further comprises a hypertext link to an anchor in a second hypertext file.

15. A documentation processor that generates browsable documentation cross-linking EBNF productions in at least one class, as per claim 14, wherein said second hypertext file is an HTML file.

16. A documentation processor that generates browsable documentation cross-linking EBNF productions in at least one class, as per claim 15, wherein said hypertext link is one of a multiway, semantic or extended link.

17. A documentation processor that generates browsable documentation cross-linking EBNF productions in at least one class, as per claim 14, wherein said hypertext link is either an Xlink or Hytime link.

18. A documentation processor that generates browsable documentation cross-linking a set of EBNF productions in at least one class, as per claim 10, wherein said documentation processor executes on a computer system remote from a location of said first hypertext file.

19. A documentation processor that generates browsable documentation cross-linking a set of EBNF productions in at least one class, as per claim 18, wherein said computer system and said location are interconnected by one of a LAN, WAN, Internet, intranet, cellular, or web-based network.

20. A documentation processor that generates browsable documentation cross-linking a set of EBNF productions in at least one class, as per claim 9, wherein said documentation processor is a java-based doclet.

21. A documentation processor that generates browsable documentation cross-linking a set of EBNF productions in at least one class, as per claim 9, wherein said documentation processor is a compiler pre-processor.

22. A documentation processor that generates browsable documentation cross-linking a set of EBNF productions in at least one class, as per claim 9, wherein an object-oriented programming language is used to code said at least one class.

23. A documentation processor that generates browsable documentation cross-linking a set of EBNF productions in at least one class, as per claim 22, wherein said programming language used to code said at least one class is one of Java, C++, Ada 95, Eiffel or SmallTalk.

24. A documentation processor that generates browsable documentation cross-linking a set of EBNF productions in at least one class, as per claim 9, wherein said extended tag further comprises a tag name and a tag value.

25. A documentation processor that generates browsable documentation cross-linking a set of EBNF productions in at least one class, as per claim 9, wherein said parser verifies a format of each element of said set of extended tags.

26. A documentation processor that generates browsable documentation cross-linking a set of EBNF productions in at least one class, as per claim 25, wherein said format is defined in an XML DTD.

27. A documentation processor that generates browsable documentation cross-linking a set of EBNF productions in at least one class, as per claim 9, wherein said documentation processor executes on a computer system remote from a location of said at least one class.

28. A documentation processor that generates browsable documentation cross-linking a set of EBNF productions in at least one class, as per claim 9, wherein said computer system and said location are interconnected by one of a LAN, WAN, Internet, intranet, cellular, or web-based network.

29. A method of processing extended tag language representations of a plurality of EBNF productions within at least one class comprising the steps:

receiving at least one source code file;

extracting a set of documentation tags from said at least one source file;

identifying a set of extended tags within said set of documentation tags, wherein each element of said set of extended tags corresponds to one of said plurality of EBNF productions;

determining for each element of said set of extended tags a corresponding reference to at least one other element of said set of extended tags, and providing, for each element of said set of extended tags, said corresponding reference to a documentation generator.

30. An article of manufacture comprising a computer user medium having computer readable program code embodied therein which implements processing of extended tag language representations of a plurality of EBNF productions within at least one class, said processing steps comprising:

receiving at least one source code file;

extracting a set of documentation tags from said at least one source file;

identifying a set of extended tags within said set of documentation tags, wherein each element of said set of extended tags corresponds to one of said plurality of EBNF productions;

determining for each element of said set of extended tags a corresponding reference to at least one other element of said set of extended tags and providing, for each element of said set of extended tags, said corresponding reference to a documentation generator.

* * * * *